United States Patent

Chikami et al.

[11] Patent Number: 6,149,387
[45] Date of Patent: Nov. 21, 2000

[54] SEAL STRUCTURE FOR GAS TURBINE FLANGE CONTACT SURFACES

[75] Inventors: Rintaro Chikami; Kaoru Sakata; Takeshi Nakamura, all of Hyogo-ken, Japan

[73] Assignee: Mitsubishi Heavy Industries, Ltd., Tokyo, Japan

[21] Appl. No.: 09/242,329

[22] PCT Filed: Jun. 12, 1998

[86] PCT No.: PCT/JP98/02592

§ 371 Date: May 12, 1999

§ 102(e) Date: May 12, 1999

[87] PCT Pub. No.: WO98/57045

PCT Pub. Date: Dec. 17, 1998

[30] Foreign Application Priority Data

Jun. 12, 1997 [JP] Japan ................................. 9-155120

[51] Int. Cl.[7] .................................................. B63H 1/00
[52] U.S. Cl. ...................................................... 416/198 A
[58] Field of Search ........................... 416/200 A, 198 A, 416/201 R, 248, 95, 96 R, 97 R; 415/115, 176, 177, 178, 174.5, 173.5

[56] References Cited

U.S. PATENT DOCUMENTS 3,916,495  11/1975  Klassen et al. ...................... 416/201 R

FOREIGN PATENT DOCUMENTS 6-257403   9/1994   Japan .
7-189604   7/1995   Japan .
8-277725  10/1996   Japan .

*Primary Examiner*—Edward K. Look
*Assistant Examiner*—Hermes Rodriguez
*Attorney, Agent, or Firm*—Sughrue, Mion, Zinn, Macpeak & Seas, PLLC

[57] ABSTRACT

A steam-cooled type gas turbine has flange contact surfaces between adjacent rotor disks in which buffering sheets such as gaskets and the like can not be inserted. Further, the contact surfaces have a large diameter, making it difficult or impossible to ensure sufficient surface contact pressure for sealing. Yet preventing the leakage of coolant steam from these flange contact surfaces presents a very important problem. The present invention provides a seal structure for flange contact surfaces of a gas turbine which can enhance the sealability at these portions. The seal structure for flange contact surfaces includes a plurality of labyrinth-like grooves (8) which are formed in at least one of the flange contact surfaces (7). The seal structure of the present invention provides a gas turbine with high reliability and enhanced sealability. Further, a high surface contact pressure is obtained by reducing the area of the flange contact surfaces.

5 Claims, 4 Drawing Sheets

SEAL STRUCTURE FOR GAS TURBINE FLANGE CONTACT SURFACES

BACKGROUND OF THE INVENTION

1. Technical Field of the Invention

The present invention relates to a seal structure for flange contact surfaces in a steam cooled type gas turbine employed in a combined cycle power plant and the like which combines a gas turbine plant and a steam turbine plant.

2. Description of the Related Art

A combined cycle power plant is an electric power generating system in which a gas turbine plant and a steam turbine plant are combined, wherein the gas turbine is adapted to operate in a high temperature region of thermal energy and the steam turbine is employed in a low temperature region to recover and use thermal energy efficiently. This type of power generating system has been attracting attention in recent years.

In a combined cycle power plant such as mentioned above, the method of cooling the gas turbine presents an important problem to be solved in the technical development of the combined cycle plant. As the result of trial-and-error attempts to realize a more effective cooling method there has been an evolution toward steam cooled systems in which steam obtained from the bottoming cycle is used as the coolant, and away from air-cooled systems in which compressed air is used as the coolant.

Now, referring to FIG. 6, description will be made of the behavior of the coolant steam flowing along flange contact surfaces in a conventional steam cooled system.

Four or so sets of rotor disks 1 each having moving blades 2 fixed at blade roots 3 are ordinarily disposed in the axial direction in a rotating portion of the gas turbine. An end rotor 4 is disposed in succession to the rotor disk 1 of the final stage at the downstream side, wherein the plurality of the rotor disks and the end rotor 4 are integrally connected by means of disk coupling bolts 5, to thereby constitute the rotatable portion of the gas turbine.

Further, the end rotor 4 is clamped to the rotor disk 1 disposed at the final stage by means of a flange clamping bolt 6 so that the end rotor 4 is brought into close contact with the rotor disk 1.

Coolant steam is fed to the rotatable portion of the gas turbine from a coolant steam supply system (not shown) so as to circulate through the moving blade 2 from the blade root 3 by way of a coolant flow passage (not shown) to thereby cool the moving blade 2. In such a case, the space defined between the rotor disk 1 and the end rotor 4 mentioned above is filled with a portion of the coolant steam.

On the other hand, due to insufficient inter-flange surface contact pressure caused by large areas of the flange contact surfaces between the rotor disk 1 and the end rotor 4 and surface roughness of the flange contact surfaces, minute gaps are formed between the rotor disk 1 and the end rotor 4. Hence, steam leaks develop through these minute gaps, as indicated by arrows in FIG. 6.

In a steam cooled type gas turbine such as described above, leakage of the coolant steam leads directly to degradation of the operating performance of the turbine. Consequently, a structure which suffers no leakage of the coolant steam is indispensable requirement.

On the other hand, it is noted that in gas turbines implemented by assembling a large number of parts, there are many flange contact surfaces such as the joining portions of the rotor disks, and further in those portions where a buffering sheet such as a gasket and the like can not be inserted, particularly in those portions having a large diameter where the area of contact increases, it is very difficult or impossible to ensure sufficient surface contact pressure for sealing.

As can be seen from the above, preventing leakage of the coolant steam along the flange contact surfaces presents a very important problem.

OBJECT OF THE INVENTION

Accordingly, the present invention, is aimed at solving the problems mentioned above, and an object is to provide a seal structure for sealing flange contact surfaces of a gas turbine which, due to the inventive gas turbine flange joint structure, improves the sealability at the flange contact surfaces.

SUMMARY OF THE INVENTION

The present invention has been made to achieve the object described above and provides a seal structure for a flange contact surface of a gas turbine having a steam-cooled structure, wherein the structure is formed as a plurality of labyrinth-like grooves in at least one of the flange contact surfaces of the gas turbine.

More specifically, by providing a plurality of labyrinth-like grooves in the flange contact surface(s), the area over which the flange contact surfaces are brought into physical contact can be reduced, and thus, high surface contact pressure can be ensured for a given clamping force applied for joining the flange surfaces together, whereby significantly enhanced sealability can be assured together with a labyrinth effect owing to the labyrinth-like uneven grooves.

Further, the present invention provides a seal structure for a flange contact surface of a gas turbine, in which the above-mentioned flange contact surfaces are contact surfaces of adjacent rotor disks between which a steam flow passage is formed.

That is, the contact surfaces of the adjacent rotor disks are brought into contact with each other over a relatively large area. Accordingly, leakage of the coolant steam is more likely to occur in these joining portions when compared with the other portions of the gas turbine. Accordingly, by forming a plurality of labyrinth-like grooves in the contact surface(s), the above-mentioned problem can be effectively solved, and the sealability of the gas turbine as a whole can be enhanced.

Furthermore, the present invention provides a seal structure for a flange contact surface of a gas turbine, in which a plurality of labyrinth-like grooves are formed in a substantial concentric circular pattern.

By forming a plurality of labyrinth-like grooves in a concentric circular pattern, a so-called labyrinth effect is created by the uneven grooves at any cross-section in radial direction, whereby the leakage of the coolant steam at the flange contact surfaces can be sufficiently and uniformly suppressed in the circumferential direction.

DETAILED DESCRIPTION OF THE PREFERRED EMBODIMENTS

Figure 1:
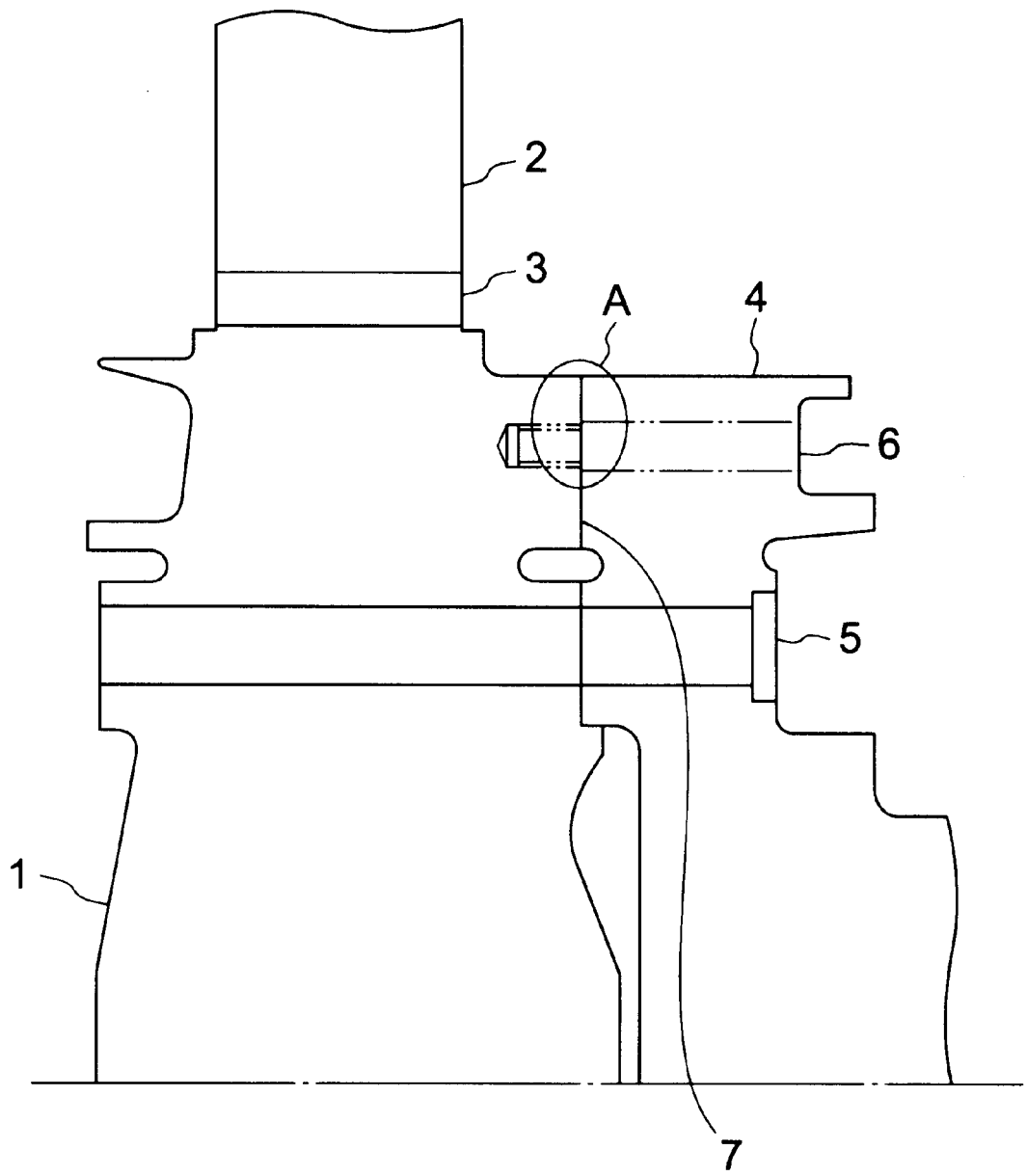
FIG. 1 is an explanatory view of a flange contact surface in a gas turbine according to a first embodiment of the present invention.

In the following description, like reference characters designate like or corresponding parts throughout the drawings. Also in the following description, it is to be understood that terms such as "right", "left", "top", "bottom" and the like are words of convenience and are not to be construed as limiting terms.

Embodiment 1

A first embodiment of the present invention will be described with reference to FIG. 1 to FIG. 5. Moreover, in the figures, like parts or components are denoted by like reference characters, and repeat descriptions thereof are omitted.

Namely, in the instant embodiment of the invention, the basic structure of the gas turbine in which a plurality of (ordinarily four) rotor disks 1 supporting moving blades 2 are disposed in the axial direction and coupled together with an end rotor 4 disposed in succession to the rotor disk 1 of the final stage on the downstream side by means of a disk coupling bolt 5 is the same as that of the conventional gas turbine described hereinbefore.

Figure 2:
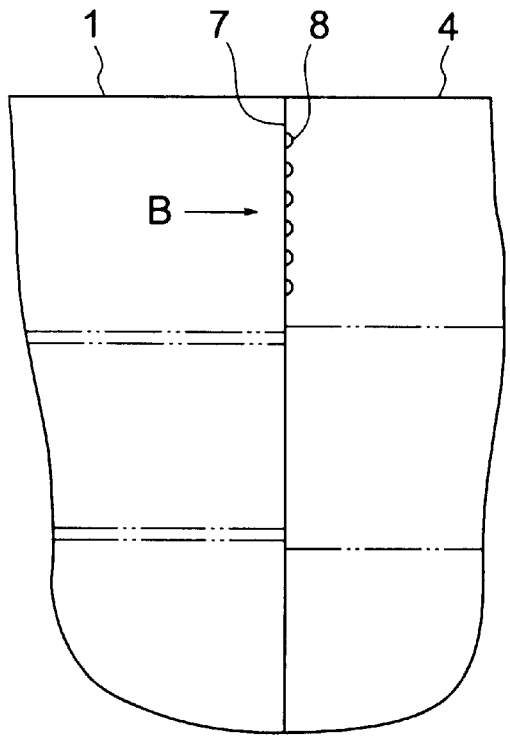
FIG. 2 is an enlarged detail view of an essential portion A of the structure shown in FIG. 1.
Figure 3:
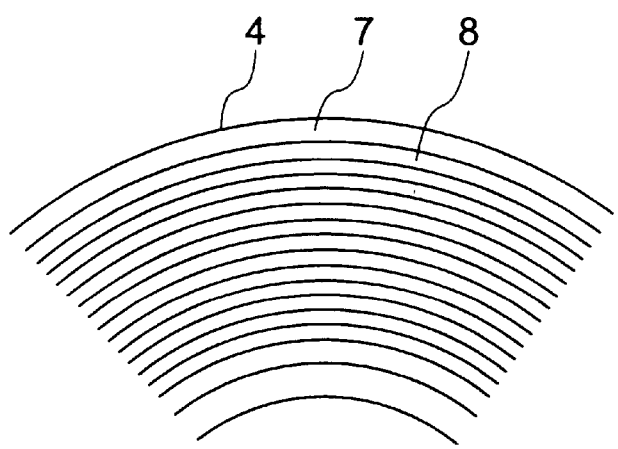
FIG. 3 is a detail view of a portion indicated by the arrow B in FIG. 2.
Figure 4:
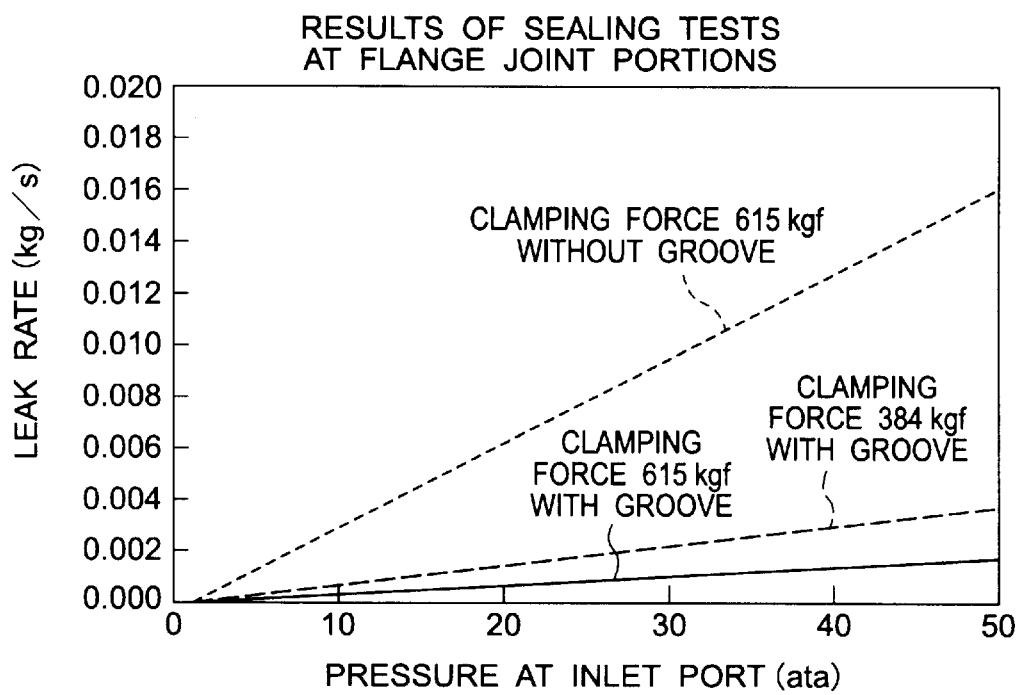
FIG. 4 is a graph of the results of sealability testing at flange joining portions in the gas turbine according to the embodiment of the present invention.

The gas turbine according to the instant embodiment of the invention is characterized in that one of the flange contact surfaces 7 of adjacent rotor disks 1 forming a steam flow passage is formed with a plurality of labyrinth-like grooves 8 in a circular pattern arrayed concentrically about the center axis of the turbine, as can be clearly seen from FIGS. 2 and 3.

By forming a plurality of labyrinth-like grooves 8 in a concentric circular array, a so-called labyrinth effect is created due to the uneven grooves 8 at any cross-section in radial directions, whereby leakage of the coolant steam at the flange contact surfaces 7 can be sufficiently suppressed.

Moreover, in the flange contact surfaces 7, the area over which the joined flange contact surfaces are brought into physical contact with each other decreases proportionally corresponding to the open area of the grooves 8, which in turn means that the clamping force applied to the flange contact surfaces 7 per unit area increases. Thus, higher surface contact pressure can be ensured at the flange contact surfaces 7 for a given clamping force, whereby leakage of the coolant steam at a location between the adjacent rotor disks where flow rate of the coolant steam is high can be more reliably suppressed.

The inventors of the present application conducted leak tests using the flange formed with a plurality of grooves as in the instant embodiment by applying two different clamping forces, 615 kgf and 384 kgf, respectively. At the same time, for the purpose of comparison, a leak test was conducted on the flange of a conventional gas turbine with no grooves by applying a clamping force of 615 kgf. The results of these tests are graphed for comparison in FIG. 4.

As can be seen in the figure, in the case of the structure in which the flange contact surfaces 7 are formed with the grooves 8, it has been found that the leakage rate is decreased by around half when the clamping force is almost doubled from 384 kgf to 615 kgf, as indicated by the solid-line and broken-line, respectively.

Further, when the clamping force of 615 kgf is applied to the flange contact surfaces 7 with no grooves in the conventional gas turbine as indicated as comparative example by a dotted-line, it is demonstrated that there is about an eight fold difference relative to the structure according to the instant embodiment, as indicated by a solid-line.

Figure 5:
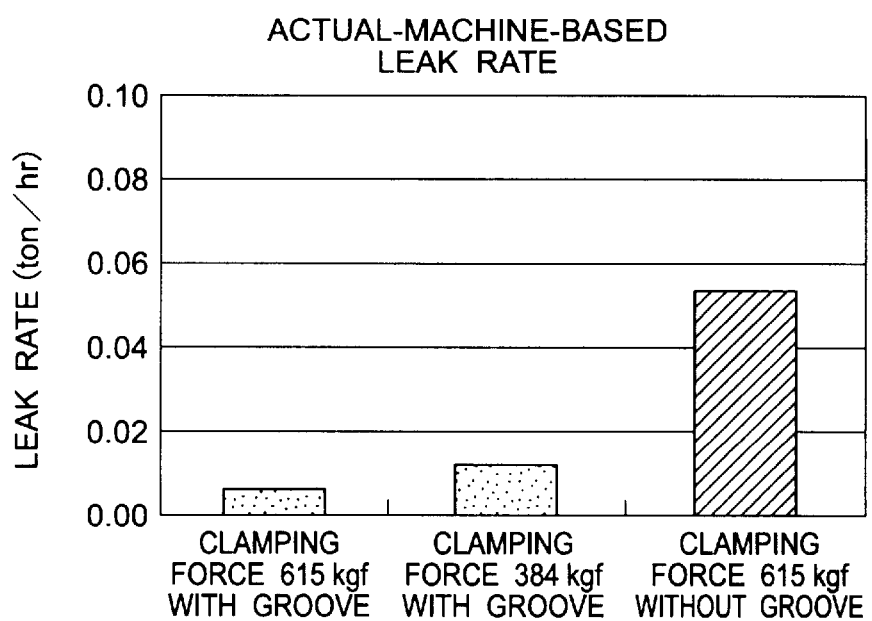
FIG. 5 is a graph of leak rates corresponding to the contents of FIG. 4 in an actual machine.
Figure 6:
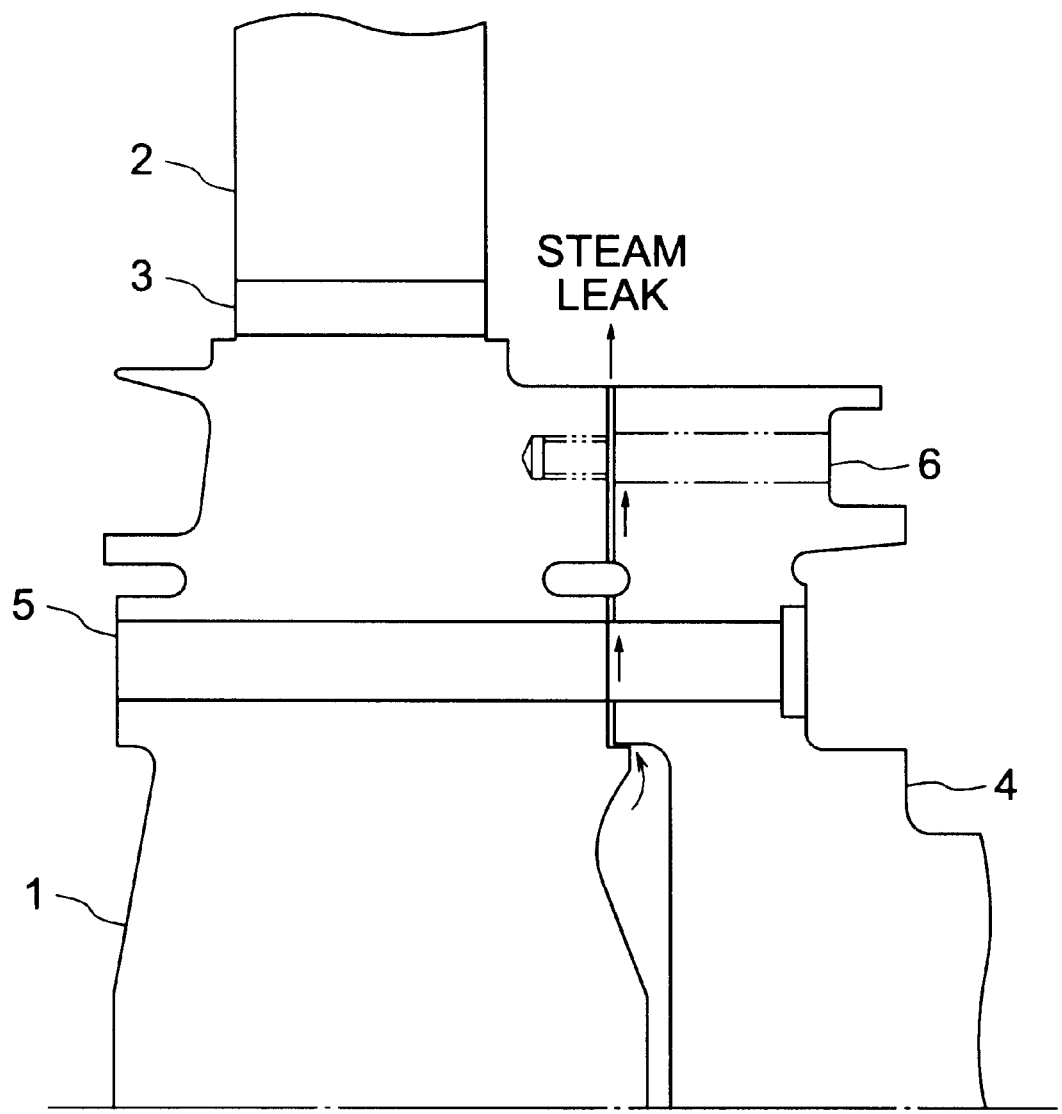
FIG. 6 is an explanatory view of a conventional flange contact surface in a gas turbine.

The above-mentioned relationship may be summarized in an actual machine as illustrated in FIG. 5. More specifically, it has been found that a remarkable difference can be seen with respect to the steam leakage between the structure in which the grooves 8 are formed in the flange contact surface or surfaces 7 and the structure in which grooves are not formed in any of the flange contact surfaces.

Furthermore, in the foregoing description, it was assumed that the grooves 8 for preventing leakage of the coolant steam are formed only in one of the flange contact surfaces 7. However, this is only for convenience of illustration, and the invention is not restricted thereto but susceptible to many modifications including a structure in which the grooves 8 are also alternatingly formed in the other flange contact surface 7.

As is apparent from the foregoing description, by virtue of the seal structure for a flange contact surface of a steam-cooled type gas turbine in which the seal structure is formed a plurality of labyrinth-like grooves in at least one of the flange contact surfaces of the gas turbine, the area over which the flange contact surfaces are brought into mutual physical contact can be reduced, and thus, higher surface contact pressure can be ensured for a clamping force applied for joining the flange surfaces together, whereby significantly enhanced sealability can be assured for the gas turbine together with the labyrinth effect brought about by the labyrinth-like uneven grooves. Thus, a gas turbine with a high operating reliability and which facilitates the practical application of the steam cooling system can be obtained.

According to a further embodiment of the invention, the seal structure for a flange contact surface of a gas turbine is implemented between the adjacent rotor disks between which the steam flow passage is formed; where, since the contact surfaces of the adjacent rotor disks are brought into contact with each other over a relatively large area, leakage of the coolant steam is more likely to occur than at other portions of the gas turbine. Hence, even the leak susceptible contact surfaces between these rotor disks can be compensated for, whereby the sealability of the gas turbine as a whole can be enhanced and the operational reliability thereof significantly increased.

Furthermore, with the seal structure for a flange contact surface of a gas turbine according to the invention yet another embodiment of, a plurality of labyrinth like grooves are formed in a substantially concentric circular pattern. Thus, a so-called labyrinth effect can be created due to the uneven grooves at any cross-section in radial directions, whereby the leakage of the coolant steam at the flange contact surface(s) formed with the grooves can be sufficiently and uniformly suppressed in the circumferential direction. Consequently, the reliability of this type of gas turbine can be remarkably improved.

In the foregoing description, the present invention has been described in conjunction with embodiments. However, the present invention is not restricted to these embodiments. It goes without saying that various alterations and modifications may be made to the concrete structure or arrangement without departing from the scope of the invention.

What is claimed is:

1. A seal structure for flange contact surfaces of a gas turbine having a steam-cooled structure, wherein the seal structure is formed as a plurality of labyrinth grooves in at least one of the flange contact surfaces of the gas turbine.

2. A seal structure for flange contact surfaces of a gas turbine as set forth in claim 1, wherein said flange contact surfaces are contact surfaces of adjacent rotor disks between which a steam flow passage is formed.

3. A seal structure for flange contact surfaces of a gas turbine as set forth in claim 1, wherein said plurality of labyrinth grooves are formed in a substantially concentric circular pattern.

4. A seal structure for flange contact surfaces of a gas turbine, comprising:

a plurality of rotor disks having moving blades fixed thereat;

an end rotor disposed in succession to the rotor disks which is disposed at a final stage at a downstream side;

disk coupling bolts for coupling together said rotor disks and said end rotor in an integral structure;

flange clamping bolts for clamping said end rotor to said rotor disk so that said end rotor and said rotor disk are brought into close contact with each other;

flange contact surfaces formed at joining portions of a rotor disk and said end rotor, respectively; and a plurality of labyrinth grooves formed in at least one of said flange contact surfaces.

5. A seal structure for flange contact surfaces of a gas turbine as set forth in claim 4, wherein said plurality of labyrinth grooves are formed in at least one of said flange contact surfaces formed in contact surfaces of the adjacent rotor disks, respectively.

* * * * *